United States Patent [19]

Munroe

[11] Patent Number: 4,657,201

[45] Date of Patent: Apr. 14, 1987

[54] FISHING REEL

[76] Inventor: Thomas Munroe, c/o Munroe Sport Reels, Inc., P.O. Box 345, Dayton, Ohio 45409

[21] Appl. No.: 794,255

[22] Filed: Oct. 31, 1985

Related U.S. Application Data

[63] Continuation of Ser. No. 669,183, Nov. 6, 1984, abandoned, which is a continuation-in-part of Ser. No. 536,019, Sep. 26, 1983, abandoned.

[51] Int. Cl.$^4$ .............................................. A01K 89/02
[52] U.S. Cl. .............................. 242/84.5 R; 242/84.53; 242/212
[58] Field of Search .................. 242/84.5 R, 84.51 R, 242/211, 212, 213, 214, 215, 99, 106

[56] References Cited

U.S. PATENT DOCUMENTS

| | | | |
|---|---|---|---|
| 1,995,221 | 3/1935 | Peel et al. | 242/84.5 R |
| 2,180,566 | 11/1939 | Thompson | 242/84.51 R |
| 2,190,398 | 2/1940 | Bugatti | 242/84.1 A |
| 2,531,816 | 11/1950 | Homody | 242/84.1 J |
| 2,535,584 | 12/1950 | Lorenz | 242/84.53 |
| 2,553,784 | 5/1951 | Parks | 242/84.5 R |
| 2,708,079 | 5/1955 | Sarah . | |
| 2,993,660 | 7/1961 | Parks | 242/84.51 R |
| 3,028,115 | 4/1962 | Hammer | 242/84.5 A |
| 3,478,976 | 11/1969 | Sarah . | |
| 3,574,339 | 4/1971 | Sarah . | |
| 3,990,323 | 11/1976 | Kamikawa | 242/84.1 J |

FOREIGN PATENT DOCUMENTS 16938 of 1904 United Kingdom ................ 242/220

Primary Examiner—Billy S. Taylor
Attorney, Agent, or Firm—Biebel, French & Nauman

[57] ABSTRACT

A heavy-duty reel includes a free-wheeling retrieve crank which is movable on a spindle to engage bosses or recesses carried on the spool for retrieval or control of the line. A brake or drag is formed on the crank and is engaged by pressing the crank against the adjacent side of the spool. A band-type drag is operated through a one-way clutch mechanism, and is mounted for control on two levers, one for adjusting the tension in the band for setting a predetermined drag, and the other for immediately applying and releasing the drag. The clutch incorporates a spring-operated shock absorber or strain relief which permits the spool to pay some line out prior to engagement of the set drag. A handbrake, operated by a squeeze action on the reel, includes an outside pad adjacent the backing plate of the reel, connected through the backing plate to an internal brake pad support and an arcuately fashioned brake pad which may be pressed into engagement with the adjacent surface of the spool for applying a braking action to the spool. The brake pad support provides a guide for the drag band in the released position of the band.

6 Claims, 16 Drawing Figures

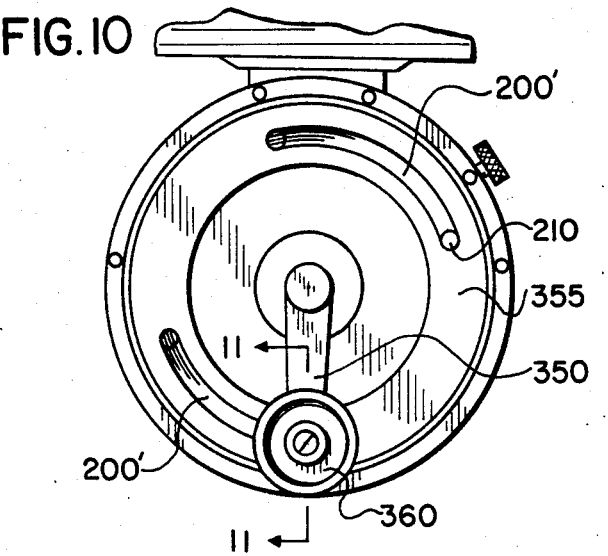
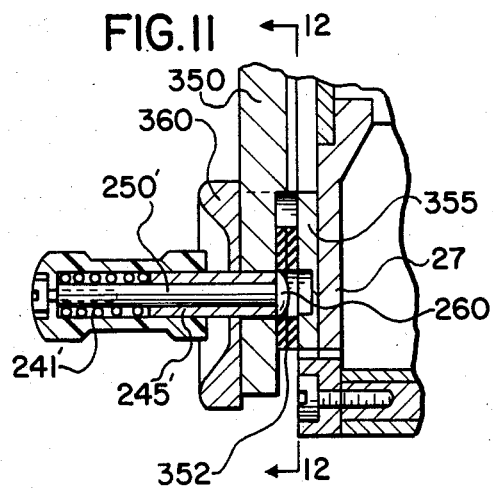
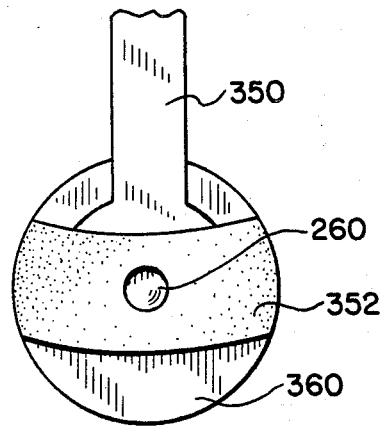

FISHING REEL

RELATED APPLICATION

This application is a continuation of Ser. No. 669,183 filed Nov. 6, 1984, which was a continuation-in-part of Ser. No. 536,019 filed Sept. 26, 1983, both now abandoned.

BACKGROUND OF THE INVENTION

This invention is related to fishing reels, and more particularly to a heavy duty fly reel of the kind suitable for salmon, tarpon, bone fish, marlin, and the like.

A well constructed heavy-duty fly reel for large game fish will commonly be provided with a ratchet-operated handle through which the reel may be wound in one direction, and with an adjustable drag by which the resistance of the unwinding of the reel may be varied. However, in lower priced reels, the drag arrangement may consist merely of a click-pawl system in which the tension on one or more pawl-biasing springs is controlled by a simple cam arrangement. On more sophisticated reels, an adjustable brake or drag is provided in addition to, or in place of, a click-pawl drag.

In some reels, provision has been made for applying a secondary restraining mechanism or drag apart from the setting of the drag on the spool. The reason for a secondary drag is that once an angler has a fish on the line, it is often not feasible to stop and make adjustments to a built-in drag, or the drag may not have sufficient capacity to control the fish. Also an adjustment of the drag can be uncertain or too slow to compensate for the unexpected action of the fish. Thus, some reels have been provided with a palming type of brake in which the rotating outer portion of the reel itself is extended beyond the side frames so that the fisherman can press his hand against the exposed rim, known as a "palming rim," and apply a measure of control to the unwind. However, this requires that the fisherman apply an upward pressure to an underslung reel with one hand, while holding the rod with the other hand, causing one hand to work against the other. In this type of reel the handle is fixed to the face of the spool, and care must be exercised least the handle strike the thumb. Also, there is the possibility of getting the hands burned on the reel or otherwise injured.

Also, a versatile adjustable mechanical drag control in handling large fish or highly energetic fish is of importance. The drag must operate through long runs without heating excessively. As the reel diameter decreases due to the paying out of the line, the reduced reel diameter imposes even greater demands on the mechanical drag. The drag adjustment itself is often inaccessible, or requires the fisherman to change hands to operate, or is subject to error in use, so that the fisherman may inadvertently adjust the drag in the wrong direction. Thus, the external palming control described above has been applied to some reels, but has been less than entirely satisfactory due primarily to the awkward position of the hands.

Internal drags themselves, which have been provided, have frequently been incapable of withstanding heavy duty use or of providing sufficient retardation over a period of time, without undue wear. Such drag is primarily used to prevent overrun of the spool and is noisy in operation. Such drags are commonly operated through a one-way or anti-reverse mechanism which disables the drag during retrieve. Commonly, cork faces are employed which are subject to wear.

In many heavy-duty reels for salmon, tarpon and the like, there is no provision for disabling the winding handle during the times that the line is being taken out from the reel. The rate of unwind, in some instances, can spin the reel at a high rate of speed, such as an excess of 1,000 rpm. A flailing winding knob attached to the spool or to a crank poses a risk of injury to the fisherman. In the construction of anti-reverse reels, the handle is attached to the brake and the control of the fish is accomplished by varying the tension. A sudden surge or jump of the fish while the tension is near the breaking point of the line or leader can cause a breakage and loss of the fish since there is no time to relieve the tension on the brake.

SUMMARY OF THE INVENTION

The fly reel of the present invention is directed to a multi-purpose, highly versatile and safe device which includes in one device an arrangement of braking and line control features which overcome the shortcomings of prior reels. It has provision for instantly setting or releasing a brake or drag tension, without ambiguity. The drag brake includes a highly efficient band-type brake mechanism employing automotive grade friction material. The band brake may be applied and released by a single snap-operated two position drag release lever. It may also be operated by either rotating a thumb screw for fine adjustment or depressing the thumb screw for rapid braking. The brake band encircles a clutch connected to the spool by one or more pawls which engage the brake mechanism when the line is taken out. The brake band, being held only at the extreme ends, conforms smoothly with the circumference of the brake, compensating for any irregular rotational movement as would be the case with a caliper brake. The reel is also provided with an integral external or auxiliary braking mechanism of heavy-duty construction which is normally spring-biased to a release position and which may be engaged by the fisherman, and without ambiguity in operation, simply by squeezing on the reel to apply a side pressure to the spool. Thus, the free hand may be effectively used to control the operation of the reel, and can aid the rod hand in the control of the fish, in whatever position the rod is held.

The reel of my invention is provided with a detached free wheeling crank of simplified construction which can be engaged with the spool either to retrieve the line or to stop the spool or to retard the fish. The crank may be extended beyond the perimeter of the reel to provide increased retrieval force when desired. The reel also has a balanced spool which may operate at high speeds without vibration or noise, or vibration caused by a conventional drag action.

In a further embodiment of my invention, I have provided for limited rotational movement of the spool with respect to the band brake drum before the friction of the drum brake is applied to the spool. This limited rotation of the spool, which may comprise approximately one-half turn of the spool, is resisted by an appropriate spring, and operates to absorb and take up shock which may be suddenly applied to the fishing line when a strike is made or when the bait encounters a non-moving obstruction or becomes snagged. This limited movement of the drum with respect to the bank brake permits a small amount of line to be paid out, under the resistance of a spring, before the drum brake comes into effect, and thus substantially reduces shock loading on the line leader and tackle.

In a further embodiment of my reel, I have additionally provided a multiple purpose retrieving crank which may function as a friction brake, or as a positive connector to the spool, at the option of the fisherman. For this purpose, the crank is provided with a portion which, separate from the retrieval handle may be depressed to urge a friction pad surface directly into contact with an annular braking surface near the outer circumference of the reel. A braking force may be applied directly to such surface, and and the same hand position that could then be used for retrieval, using the handle and crank in the conventional manner.

The particular advantage of the reel of my invention is that it permits highly versatile control. A fisherman may disconnect the brake to allow free stripping preparatory or casting or to allow the fish a free line or when trolling.

A fisherman may set the internal drag, through a positive adjusting screw mechanism, at a minimum drag level which he anticipates would be required in the event of a strike, and can immediately release and reset the same by a drag release lever returning the drag to the preset position.

The fisherman knows that he has available to him a highly effective external brake operating independently of the internal drag, which he may apply with a side pressure, through a friction pad, directly to the side of a thrust-bearing supported spool, on the side remote from the winding or handle side, by a simple squeezing action. The hand applied brake is formed with a brake pad supporting plate of arcuate shape positioned inside the back plate of the reel, with an inside semi-circular or arcuate surface which is closely spaced to the drum of the adjustable drag. The extended edge surface of the brake plate is used as a backing surface for the stainless steel band of the drag, and assures when the band is released by the release lever, that the band forms a generally true circle so that it is evenly spaced from the drum and permits the drum to rotate free of any contact or dragging connection with the band.

The advantages of this reel include its ruggedness, light weight, absence of oiling requirements, and versatility in the manners in which it may be used.

It is accordingly an important object of the invention to provide a safe reel which is exceedingly versatile in operation, which has an independent retrieve handle, an internal readily adjustable, highly efficient drag brake system, with on or off positions instantly available, and an easily operable squeeze-type external auxiliary reel braking system and an automatic cushioning means in the clutch between the spool and brake.

The arrangement of my invention provides for a highly versatile fishing reel in which the crank handle, the adjustable drag, and the external hand brake may be used separately or in selected combinations. For example, the crank handle, which is independently mounted, may be depressed to engage the spool and rotated in a forward direction to provide a positive retrieval, but the same handle can be instantly released if need be, thus releasing the spool and permitting the handle to hang free. Engaging the handle after the fish has been arrested will provide a positive stop.

The crank is in one alternative embodiment prevented from engagement by means of a spring-loaded plunger or pin which normally urges the crank into its disengaged or free position. The side of the spool adjacent the crank is free of any protuberances, but is formed with arcuately extending tapered recesses which lead to ledges formed in the side of the spool, providing for retrieval of the reel in either direction. The crank is mounted on the spindle for free rotation in either direction. The end of the crank is provided with a finger-gripping handle which is movable by depressing the same against the side of the reel. The handle itself carries with it a headed pin, which extends through the crank, and which is spring-loaded or spring-biased to a retracted position. By depressing the handle, the head of the pin is caused to engage the spool to accomplish the desired connection with the spool at the recesses, and when the handle is released, the end or head of the pin is flush with the bottom of the crank. The handle or crank also serves as an effective brake which may be controlled independently of the engagement of the handle with the spool for retrieving purposes. A headed pin engages a recess in a locked attitude until released by a slight back movement.

Thus, further features and advantages of the embodiment of the invention include the employment of a lightweight spool, simple yet positive arrangements by which the handle may be operated to engage the spool, but is otherwise free-wheeling on spindle, an effective band-type internal brake drag with infinite screw adjustment and positive release incorporating the provisions for fast thumb engagement when necessary, an effective spring-loaded, one-way clutch for engaging the spool with the adjustable drag brake, and ball bearings for mounting the hub and supporting said spool against axial thrust and ball bearing mounted brake.

A further important object of the invention is the provision of a reel having an auxiliary braking mechanism, which may be activated by simply squeezing the body of the reel with one hand while handling the rod with the other.

A further object of the invention is the provision of a braking mechanism in a fishing reel incorporating a clutch-operated brake which acts as a drag to control or resist the outward paying of line from the reel, preferably in one direction of rotation only, and incorporating therein a lost motion connection or a shock-absorbing connection between the reel and the one-way clutch, which permits the reel to rotate less than a full rotation but through a limited degree without causing the clutch to rotate or without engaging the brake, in combination with a spring which tends to urge the reel in the retraction direction. In the preferred embodiment this is accomplished by providing an arcuate slot in the clutch, a pin on the spool which operates within the slot to engage the clutch, and a torsion coiled spring which engages the pin tending to urge the pin into one end of the slot, in the retraction direction of the spool.

Thus, another object of my invention is the provision of a reel which has an independent crank handle which is engaged with the spool only upon selection by the fisherman, and thus which does not otherwise rotate with the spool, to prevent injury to the hand. An advantage of such a reel is that it is relatively safe, since the reel handle is mounted on its spindle independently of the spool.

While the reel functions superbly as a fly reel, the combination of independent handle, on or off release of the brake and the hand brake combine to allow the reel to function efficiently as in fresh water trolling or salt water fishing with either surface or weighted outrigger depending upon the kind of lure employed.

BRIEF DESCRIPTION OF THE DRAWINGS

FIG. 10 is a fragmentary side elevation of a modification showing a crank handle with a brake pad thereon adapted for engagement with the exposed side of the spool;

FIG. 11 is an enlarged transverse section taken generally along the line 11—11 of FIG. 10;

FIG. 12 is an enlarged elevational view of the brake pad on the crank looking generally along the line 12—12 of FIG. 11;

DESCRIPTION OF PREFERRED EMBODIMENTS

Figure 1:
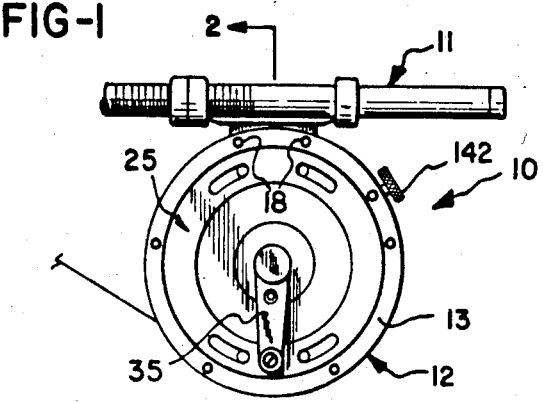
FIG. 1 shows my reel in a left hand retrieve configuration attached to a rod handle.
Figure 2:
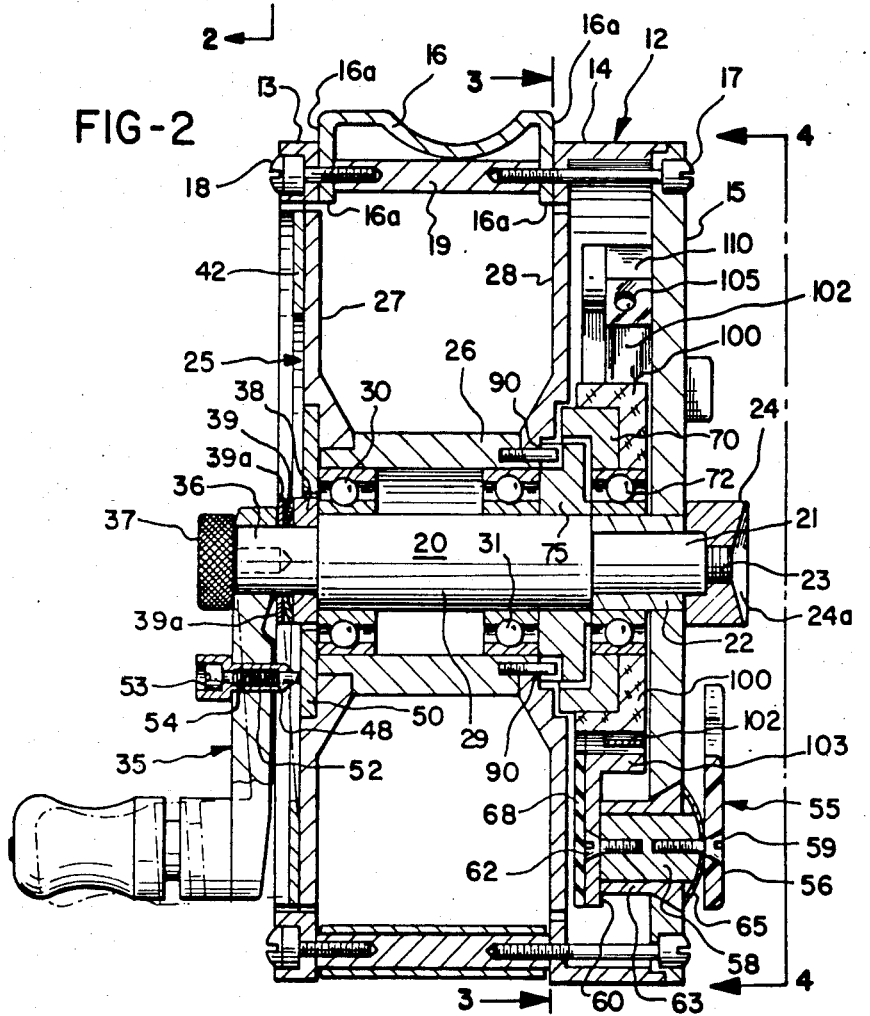
FIG. 2 is an enlarged sectional view looking generally along the line 2—2 of FIG. 1.

Referring to the figures of the drawing which illustrate preferred embodiments of the invention, a left-hand retrieve reel designed according to my invention is illustrated generally at 10 in FIGS. 1 and 2. The reel 10 as shown in FIG. 1 is mounted on the butt end or handle of a fly rod 11. Referring to FIGS. 1 and 2, the major components of the reel 10 include a frame 12. The frame 12 is made up of an annular ring 13, an annular cage 14, and a back wall or back plate 15. The frame components further include a mounting foot 16 which has side members 16a retained between the cage 14 and ring 13 by pairs of retainer screws 17 and 18 extending therethrough from the opposite sides into an intermediate spacer bar 19. The retainer screw 17 extends through clearance openings in the cage 14 and is threaded into the spacer 19 while the retainer screws 18 extend through clearance openings in the frame ring 13 and into the spacer 19.

The frame 12 firmly supports a central non-rotating spindle 20. A reduced end portion 21 of the spindle 20 extends through a bearing sleeve 22 and the back plate 15, and the exposed threaded end 23 is firmly retained by a spindle lock nut 24. The nut 24 has a coin slot 24a for easy removal, to permit takedown of the reel by removing the nut, thus releasing the spindle 20 from the frame 12.

The major rotating components of the reel 10 includes a spool 25 with a central hub portion 26, a front wall 27 and a rear wall 28. The spool 25 may be formed of woven graphite material provide extremely high strength combined with light weight. This same material may be used for the back plate 15, if desired. Alternatively, the spool may be formed as a light-weight investment precision casting, if desired or machined from aluminum. The hub 26 of the spool 25 is rotatably mounted on a central enlarged portion 29 of the spindle 20, on a pair of axially spaced pressed-in precision ball bearings 30 and 31.

A further rotating component includes a retrieve crank 35. The crank 35 is rotatably mounted on a forward end 36 of the spindle 20 and is retained in place by a spindle cap screw 37. The crank 35 is spaced from the enlarged spindle portion 29 by a spindle washer 38 and a spring washer 39 and plain washer 39a therebetween. The handle crank 35 is free to rotate on the spindle at the reduced portion 36 and thus may be considered as a free-wheeling. A handle 40 is carried on the end of the crank.

Figure 7:
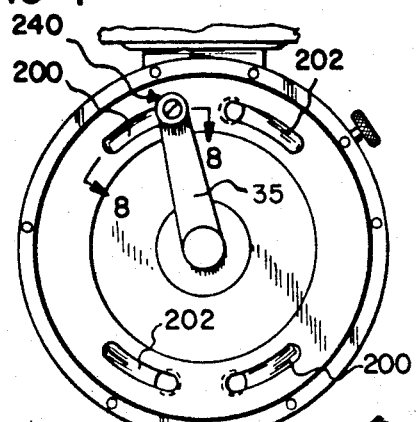
FIG. 7 is a side elevation.
Figure 8:
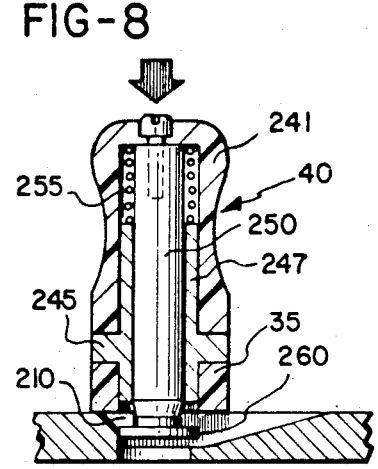
FIG. 8 is an enlarged fragmentary section taken generally along the line 8—8 of FIG. 7 showing the handle pin engaged with the spool.
Figure 9:
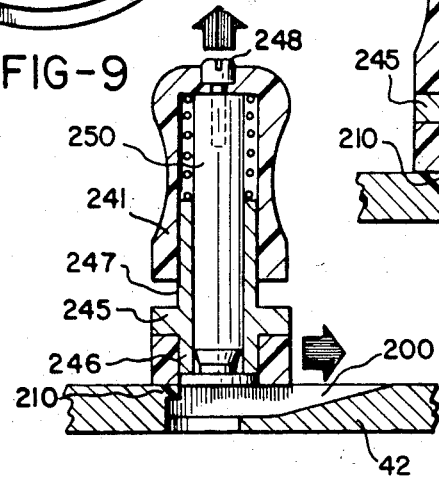
FIG. 9 is a view similar to FIG. 8, but showing the spool-engaging handle pin in the normal or released position.

The reel includes an arrangement by which the crank is caused to engage the spool 25 for braking and/or retrieval action. The outer wall 27 of the spool is formed with an annular stainless steel plate 42, in which pairs of inclined recesses 200 and 202 are formed, which recesses terminate at partial ledges 210, thereby providing notches or grooves which may be selectively engaged by the crank when desired. As shown in FIG. 7, the recesses 200 and 202 may consist of pairs of oppositely extending semi-circular recesses which extend somewhat axially into the member 42, permitting a fisherman to select between either clockwise or counter-clockwise rotation, and thereby slope gently into the face of the front wall surface of the ring 42, to terminate at a respective ledge. For its part, the handle 40 is shown in partial sections in FIGS. 8 and 9 as including a finger grip portion 241 which is movable in and out on a flanged support 245 carried on the end of the crank 35. The flange support 245 is formed with an inwardly extending flange portion 246 received within an opening formed on the end of the crank and press fitted therein, and is further formed with an outwardly extending cylindrical portion 247 which slidably receives the finger-gripping part 241 of the handle. The finger-gripping part 241 supports a pin on the inside surface as retained by screw 248, the pin being slidably received within the member 245. The pin 250 is formed with a head 260 on the end thereof proportioned to be received within the recesses 200 or 202 and particularly proportioned to be received under the ledge 210. A small coil spring 255 biases the finger-grip portion 241 and the attached pin 250 to its raised or normal position as shown in FIG. 12 in which the head 260 of the pin 250 is received against the flange 246 and within the opening formed within the crank. However, when the handle is depressed in the direction of the arrow as shown in FIG. 8, the head 260 is caused to enter into one of the respective recess pairs, according to the direction of rotation of the spool, to bring the head 260 under the ledge 44 in either driving or braking engagement with the spool. The handle may be released simply by backing it up slightly so that the pin 260 comes out from under the ledge and is retracted automatically by the spring 255.

The crank may be depressed whenever desired to bring the button 212 into contact, permitting it to glide smoothly through one of the grooves or recesses 200 and 202, depending upon the direction of rotation, and into engagement with a ledge 44 for braking or for retrieval action. The exposed face of the spool is now free of any protuberance which could come into contact with the fisherman's hands, when the spool is turning rapidly, thus enhancing the safety of the reel.

The handle crank 35 may be normally urged or biased to its free turning or free wheeling position, by a spring-biased plunger 48 mounted in the crank 35 with the spring stud or plunger portion in sliding engagement against a stainless steel disc or annular plate 50 carried on the hub portion 26 of the spool 25 at its outer face. The plunger 48 is contained within a plunger housing 52, and a cap screw 53 bears against a spring 54 which normally urges the plunger 48 into running engagement with the plate 50 and thus urges the crank 35 to an outer free position. Thus, during casting, or when a fish is running out with the line, the handle is not driven by the spool 25, and accordingly there are no flailing or rotating parts which could injure the user or impede the free action of the spool 25.

Figure 4:
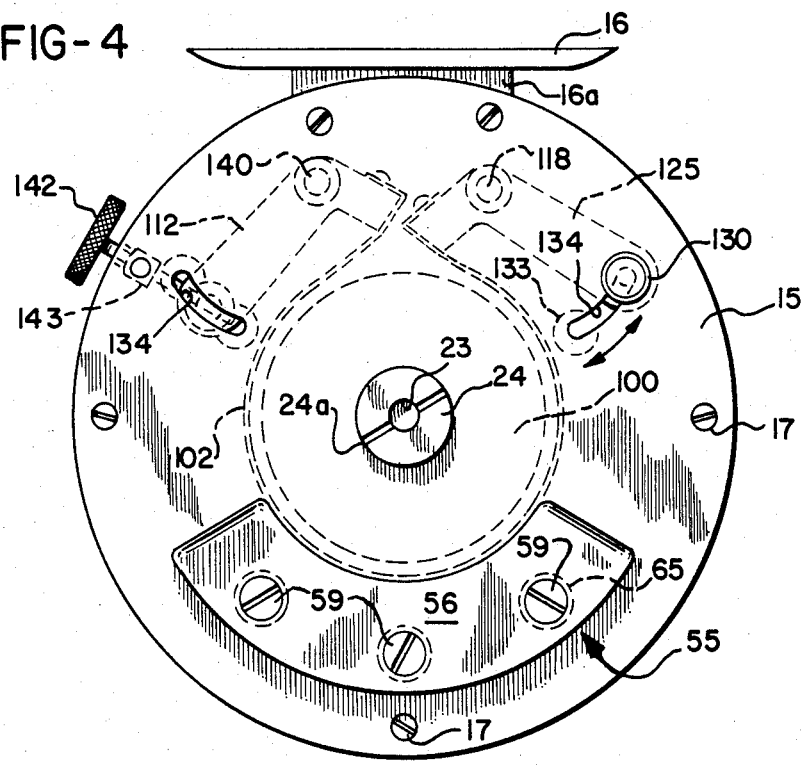
FIG. 4 is a side elevation as viewed along the line 4—4 of FIG. 2

The reel 10 is also provided with a conveniently operated hand brake through which the spool 25 may be braked under positive control of the fisherman. The hand brake is in the form of a squeeze-type brake indicated generally at 55 in FIGS. 2 and 4. The brake 55 includes portions which extend through the back plate and into direct contact with the spool, so that it is engageable or usable by a fisherman, merely by squeezing against the brake to engage a friction pad with the side wall 28 of the spool, applying a direct retarding force to the spool. The brake includes an arcuately shaped plate or pressure pad 56 positioned adjacent the outer surface of the back plate 15, and which may be formed of plastic material. The plate 56 is provided with portions which extend through the back plate 15, in the form of posts 58 which may be formed as an integral part of the pad or formed as separate posts, through bushing sleeves 58a on the plate and retained by screws 59. The hand brake 55 provides means for retarding the rotation of the spool without touching either the line or spool.

Immediately inside the plate 15 there is provided an arcuately shaped braking pad support plate 60, having an outline similar to that of the pad 56, and also joined to the posts 58 by screws 62. The posts 58 are guided for transverse movement through inwardly extending sleeves 63 formed on the plate 15, as shown in FIG. 2. Springs in the form of a spring coil or a spring washer 65 are positioned between the plate 15 and the pressure pad 56, to hold the pad in its retracted position.

The face of the plate or pad 60 is lined with a bonded layer of friction-braking material 68, which may consist of leather or other friction material. When the plate 60 is retracted by the spring 65, the friction face or layer 68 forms a clearance with the adjacent side of the wall 28 of the spool 25. When it is desired to engage the brake, the fisherman can simply squeeze on the brake, thus applying a pressure to the handbrake pad 56 causing the friction material 68 to engage the spool 25. The amount of braking force may easily be controlled by regulating the amount of pressure applied to the brake.

Figure 3:
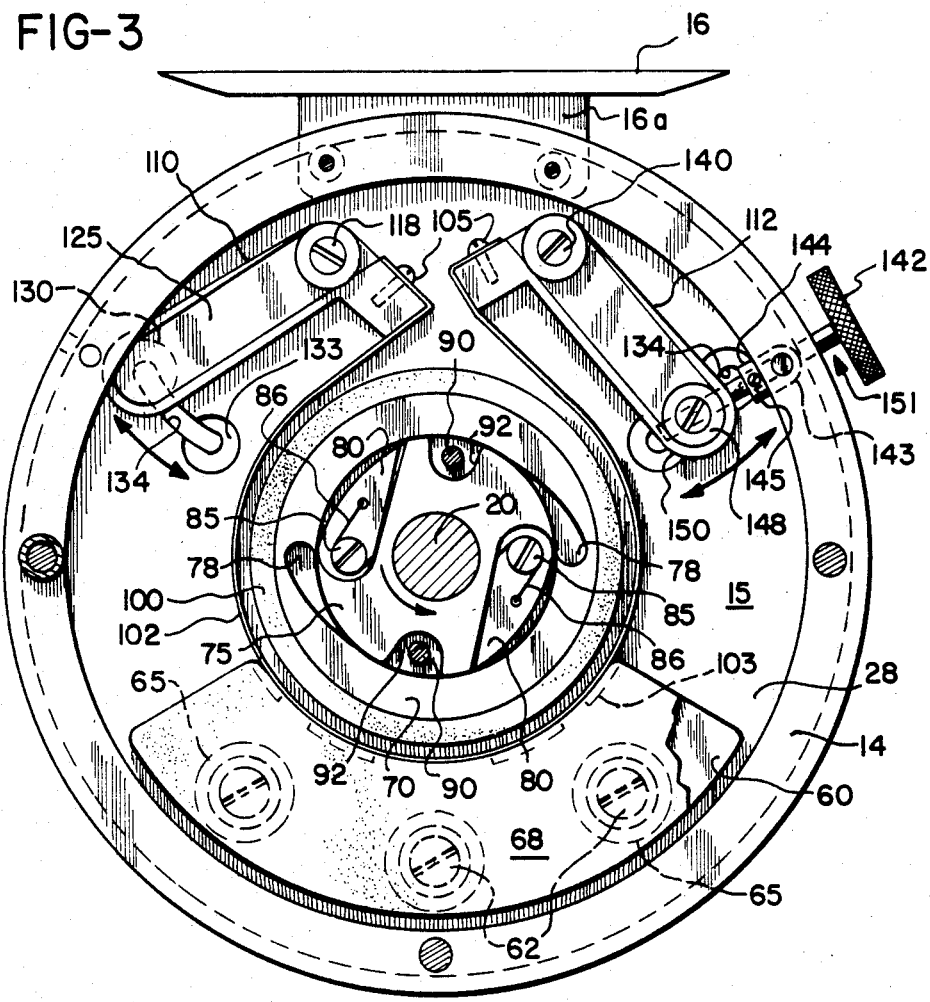
FIG. 3 is a sectional view looking into the back plate and showing details of the drag end braking mechanism looking generally along the line 3—3 of FIG. 2.
Figure 5:
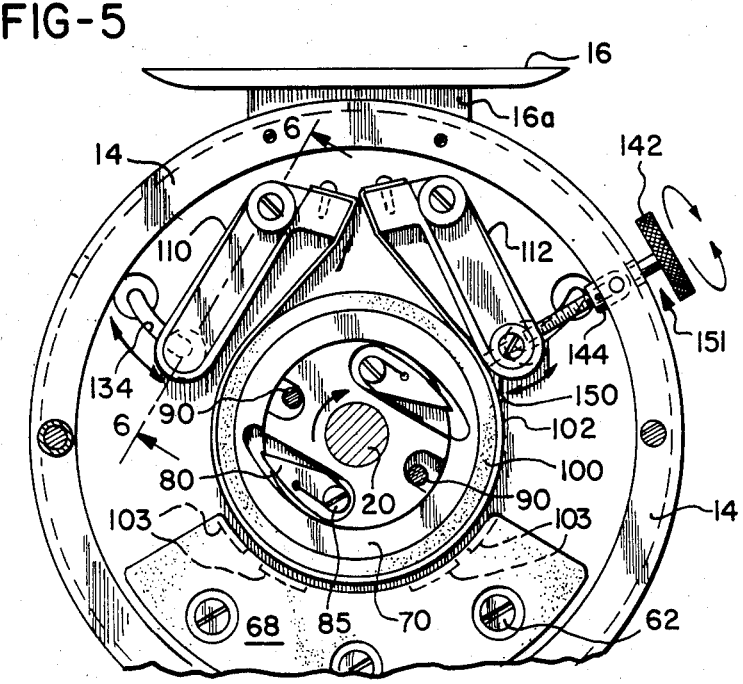
FIG. 5 is a fragmentary view similar to FIG. 3 showing the drag brake in the engaged condition.

It is also important in a fly reel of the kind described, to provide a drag type brake or, in other words, an adjustable drag, which may be preset to desired levels, and quickly released when desired. The reel of the present invention includes a highly efficient drag-type brake which is best illustrated in FIGS. 3 and 5. A band-type drag is incorporated which is highly efficient and yet infinitely adjustable with a large heat-dissipating capacity. The drag of this reel is connected to the spool through a one-way clutch arrangement so that the drag operates only against the reel in the outrunning direction, and thus retrieval may be had in the opposite direction immediately and irrespective of the setting of the drag and without friction. The components of the drag include an annular brake drum 70 which is mounted for rotation on the spindle portion 21, on a precision ball bearing 72 (FIG. 2). The brake drum 70 is somewhat cup shaped in cross section, to conserve space, and partially receives therein the body 75 of a one-way clutch. As best shown in FIG. 3, the drum 70 is provided with a pair of inclined pawl-receiving V-shaped notches 78. The notches are proportioned to receive spring biased pawls 80 carried for rotation on the clutch body 75, and pivotally mounted on shoulder screws 85. The pawls 80 are apertured to receive the end of a torsion spring 86 which is wrapped around the screws 85 and normally urges the pawls into an outer position, so that the same engage the notches 78 in one direction of rotation only, as shown in FIG. 5.

The clutch body 75 is carried for rotation on the spool 25 by means of a pair of drive pins 90 which extend axially of the hub portion 25 and are received in U-shaped openings 92 formed in the outer surface of the clutch body 75, so that the clutch body at all times rotates with the spool. When rotating counter-clockwise, as viewed in FIG. 3, the pawls 80 simply slip by the notches 78. However, during clockwise rotation as viewed in FIG. 5, the toe ends of the pawls 80 move into the notches 78 formed in the brake drum and cause the drum 70 to rotate with the clutch. The outer circumference of the drum is provided with an annular band 100 of high grade friction material, such as automotive type brake material. A tempered stainless steel brake band 102 substantially encircles the brake drum band 100.

The brake pad supporting plate 60 provides a guiding function for the brake band 102 in the released position of the band to assure that it substantially forms a circular outline and is totally free of the friction material on the drum when the brake band is in the released position. For this purpose, the plate 60 is provided with a semi-circular or arcuate curvature, at its inner vertical edge 103 which is closely spaced to the outer surface of the drum and thus is closely spaced to the band 102. When the band is released, as shown in FIG. 3, the band expands into contact with the surface 103. The surface 103 guides the band thereabout and supports the back surface of the band in the released position in such a manner that the band, conforming to the surface 103, is assured of a clearance space with the drum and with the friction material on the drum so that the spool may run completely free of drag when the band has been released.

Figure 6:
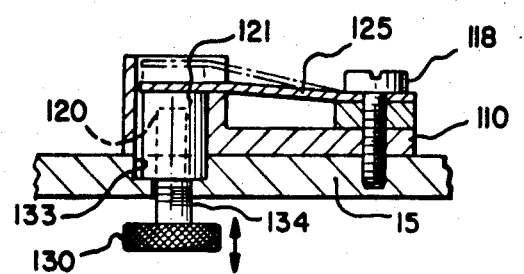
FIG. 6 is an enlarged fragmentary section through the band release lever.

The reel includes provision for tensioning the brake band 102, to apply a predetermined and constant drag to the spool through the one-way clutch. Each end of the band is anchored over one leg end of substantially identical generally L-shaped levers, by means of anchoring screws 105. The pair of levers include a first lever employed as a drag release lever 110, to which one end of the band is anchored, and the other consists of a drag adjust lever 112 to which the opposite end of the band is anchored with the band substantially encircling the brake drum. While the levers 110 and 112 are preferably identical in construction, they serve different purposes. The lever 110, which is pivotally mounted to the back plate 15 on a post 118, is movable between two stable limit positions to engage and disengage the brake band 102 from the friction material 100. In FIG. 3 it is shown in the disengaged position, relaxing the tension on the band 102, while in FIG. 5 it is shown in the engaged position. A locking nut 120, FIG. 6, moves through a clearance opening 121 in the lever and is spring biased by a leaf spring 125 captured under the pivot post 118, and is depressible by a thumb screw 130, to permit the lever 110 to rotate in either of its two positions. The nut 120 provides for locking of the lever 110 in each of these positions by movement of the nut 120 into one of a pair of clearance recesses 133 through a connecting slot 134 formed in the plate 15.

Initial tension or drag is applied to the band 102 by the drag lever 112. The lever 112, as previously noted, may conveniently be made as a duplicate of the lever 110, and pivots about a drag pivot screw 140. The opposite end of the band is attached to the leg of this lever, and the lever itself is infinitely adjustable by means of a thumb drag screw 142 to rotate in the direction of the arrow, as shown in FIG. 3, for applying or releasing tension from the brake. The thumb screw 142 passes through a removable bronze collar or sleeve 143 piloted in a suitable opening formed in the cage 14, and is retained by a collar 144 locked onto the threads inside the cage by a set screw 145. The end of the screw extends through a threaded circular pivot nut 148 carried in an opening formed in one arm of the lever 112, so that rotation of the screw 142 causes the lever 112 to pivot about the screw 140 and either add or subtract tension to the band. Additionally, a toe portion 150 of the lever 112 may be driven by the screw into direct frictional engagement with the outer surface of the band, as shown in FIG. 5, thus providing an additional braking force when required. As shown in FIG. 3, a clearance space is provided between the head of the drag thumb screw 142 and the outer surface of the case or frame to permit the screw to be depressed for activating the drag by thumb pressure.

The drag release lever 110 may be moved between either of its respective stable positions as shown in FIGS. 3 and 5 by suitably depressing the button 130 extending through the plate 15, thereby releasing the lever for pivotal movement through the slot 134 connecting the recesses 133. Accordingly, the drag release lever 110 may be used for immediately releasing all of the drag, and since the band 102 is closely guided by the inside surface 103 of the brake plate 60, the full tension is rapidly released throughout the length of the band 102.

When it is desired to utilize the reel with right-hand retrieval, it is only necessary to reverse the function of the levers 110, 112, and to replace the clutch with a right-hand drive clutch and right-hand brake drum. Thus, in assembling and distributing the reels it is a simple matter to provide either right or left-hand retrieve models. An opening in the cage 14 is provided opposite the end of the lever 110 to receive the guide 143 and the thumb screw 142, while the lever 110 is apertured to receive the threaded pivot nut 148, since the respective parts 110 and 112 may be identical and thus interchangeable, thereby simplifying manufacture.

The invention thus provides a versatile fly reel which may be used in a number of ways or combination of ways for the control of a fish, and yet is safe and easy to use. The band type drag is capable of dissipating a substantial quantity of heat without undue wear and without change in braking effect. It may be applied, once the thumb screw 142 has been set, simply by flipping the lever 110 and may be as easily released. In addition, the fisherman has the option of a pressure-type brake in the form of the handbrake 55 merely by squeezing the reel and applying pressure to the pad 56, which brake may be used in conjunction with the drag, if desired. As noted, the positive highly effective additional drag or brake may be applied by rotating the thumb screw sufficiently to bring the toe 150 of the lever 112 into pressure engagement or registration with the outside surface of the band 102, and the screw is capable of pressing the lever with great force, which will provide either a drag or braking effect irrespective of whether or not the brake band has been set by the lever 110. A further means of controlling the fish consists of the handle 40 which may be depressed to bring the pins 250 into engagement with one of the pairs of grooves 42 on the spool for holding a fish or retrieving the same.

As noted above, one important feature of my invention resides in the fact that a preferred embodiment incorporates a shock absorber or shock relief mechanism by means of which the spool may rotate in the direction to pay out line, such as upon the occurrence of a strike, or the line or fishing tackle snagging on an obstruction, which mechanism permits the spool to rotate through a limited extent of rotation, less than one full revolution, against the resistance of a spring, prior to the engagement of the drag brake 100. In the embodiments which follow, including FIGS. 10-13, like parts are identified with the same reference numerals which have been used heretofore in connection with the description of corresponding parts of the reel in FIGS. 1-9.

Figure 13:
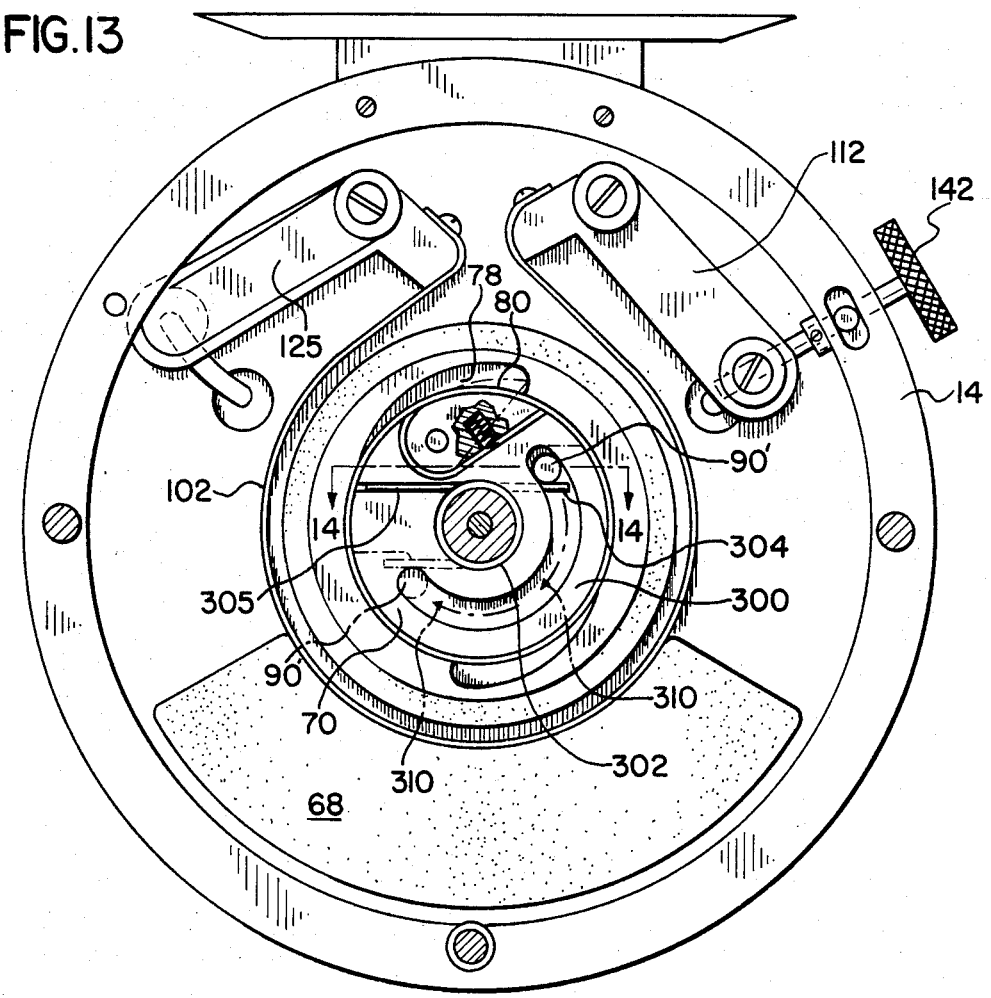
FIG. 13 is an enlarged elevational view, similar to FIG. 3, and showing a modification of the clutch mechanism incorporating a shock absorber mechanism.
Figure 14:
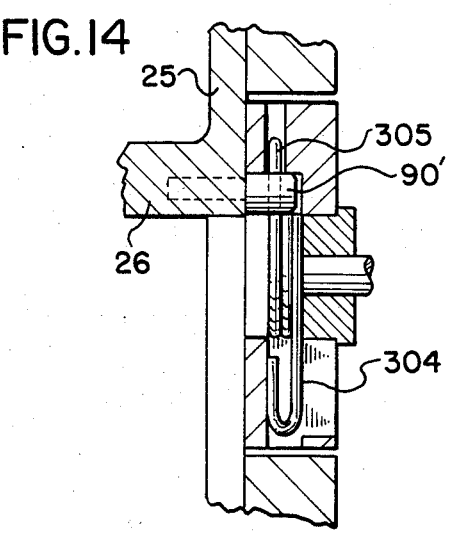
FIG. 14 is an enlarged fragmentary sectional view taken generally along the line 14—14 of FIG. 13 showing details of the engagement of the hub of the spool with the clutch in the embodiment of FIG. 13.

The shock absorber mechanism, mentioned above, which can prevent the undesired snapping or breaking of a line, is preferably incorporated into a modified form of the previously described clutch mechanism 75. In this embodiment, as best seen in FIG. 13, a modified clutch 75' is incorporated in place of the clutch 75 and carries only a single pawl 80. The slots 92 and drive pins 90 have been eliminated and in their place a single drive pin 90' is threaded into the adjacent face of the hub, as best shown in FIG. 14. The pin 90' moves within a closed arcuate slot 300 formed in the clutch body 75' and extending throughout approximately 180° of arcuate travel. The pin 90' is normally urged to a seated or recessed position, as shown in full line, by means of a torsion spring 302 which has one end thereof trapped in a slot 304, and has its opposite end 305 extending into the arcuate slot 300 and bearing against the pin 90'. The spool 25 and its associated hub 26, a fragment of which is shown in FIG. 14, may now turn, against the resistance of the spring 302, in the direction of the arrow 310, into the opposite limit position of the arcuate slot 300, as shown by the broken outline form of the pin at the end of the series of arrows. In this direction of rotation, the reel can turn a corresponding extent, less than a revolution, and pay out a certain amount of line against the resistance of the coil spring tending to return the pin 90' to its seated position shown. During this movement, the clutch body 75 does not move if the pawl 80 is engaged as shown.

The mechanism thus acts as an effective shock absorber to prevent the otherwise sudden impact of tension on a line which may exceed the breaking point of the line. Once the pin 90' has moved to the phantom position, the clutch body 75 is picked up and the surrounding drum brake 70, carried by the pawl 80, will rotate, and the drag will be that as established by the encircling band 102, all as previously described in connection with FIG. 3. When the tension on the line is released, the pin 90' will be carried back to its seated position by means of the coil spring 302. Accordingly, the lost motion connection shown in FIGS. 13 and 14 permits the movement of the spool through a limited extent prior to the engagement of the brake to take up any sudden shock which may be applied, and provides protection for the line.

FIGS. 10–12 illustrate and represent a further preferred embodiment of a brake for control of movement of the spool by the fisherman, independent of other braking arrangements which have been provided. In this instance, a brake is incorporated directly onto the crank which, as in the preceding embodiment, is mounted for relatively free rotation about the central spindle. An improved crank 350 is provided with an enlarged brake pad supporting head on which a generally arcuately spaced friction pad 352, such as leather, may be applied as shown at 352 in FIG. 12. The leather or composition pad 352, carried on the crank 350, is juxtaposed adjacent an annular band 355 of hard material, such as stainless steel, carried on the side wall 27 of the spool 25. The previously described slots or recesses may receive a pin carried on the handle. In this instance, the slots 200' are double ended with the recesses formed at the opposite ends defining the lips 210.

A plate 360 is carried on the end of the crank 350 in surrounding relation to a pin guide 245' and provides means by which the crank 350 may be depressed to bring the leather brake pad 352 into engagement with the annular braking surface 355 without depressing the pin 250'. However, when it is desired to make a positive engagement between the crank 350 and the spool, it is only necessary to depress the handle 241', in the manner previously described, to carry the head of the pin 250' into either of the double ended slots 200'. The slots 200' are tapered so that they are deeper at their opposite ends and terminate in the previously defined ledges 210 which engage the head of the pin to provide for positive cranking engagement in either direction of rotation of the crank handle.

Figure 15:
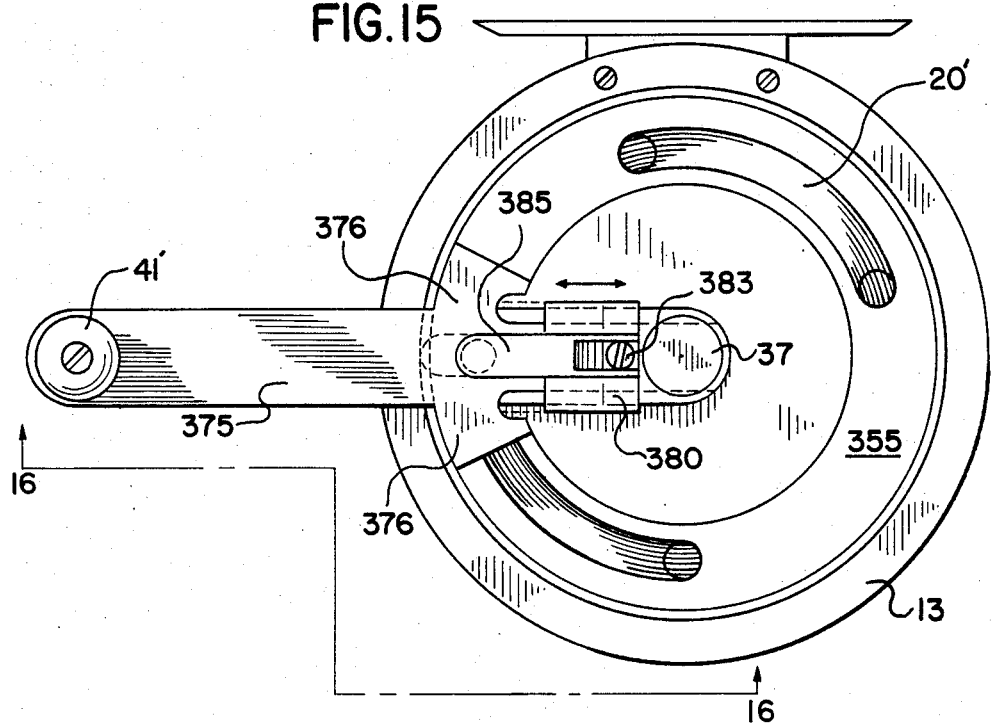
FIG. 15 is an enlarged side elevational view of the reel showing an extension crank handle thereon.
Figure 16:
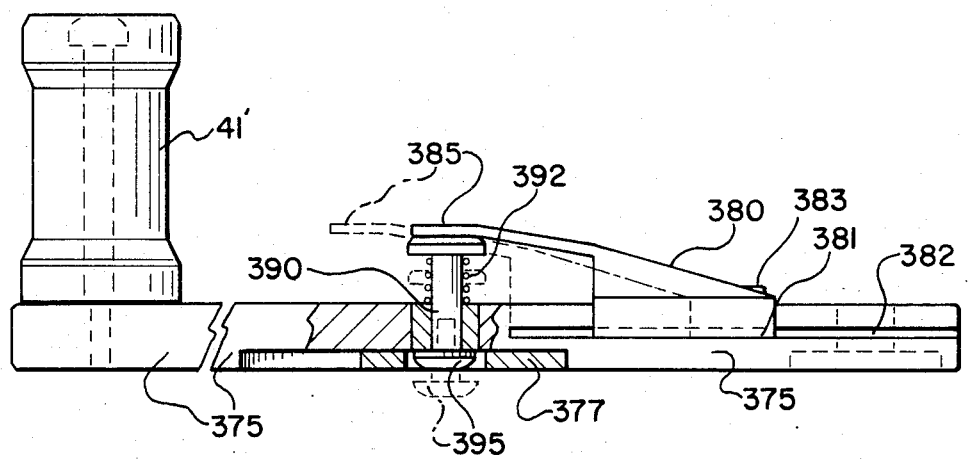
FIG. 16 is an enlarged side elevation, partly broken away, of the elongated crank of FIG. 15, partially in section to show the locking pin and brake mechanism.

FIGS. 15 and 16 show the manner in which a removable extension handle may be applied to the reel to increase the available retrieval power, and incorporates a brake pad on the crank, which may be engaged directly with the adjacent face of the reel simply by depressing the crank against the reel. The extension handle 375 increases the mechanical advantage which the fisherman has with respect to retrieving a line on the spool. The handle 375 is similarly pivotally mounted on the spindle and retained by the retaining nut 37 and has a length which exceeds substantially the radius of the spool. The handle 41' is conventionally mounted by a mounting screw 40' on the remote end of the crank 375. Intermediate the ends of the crank, and overlying the hardened or stainless steel braking band 355, is a generally arcuately extended widened portion 376, the inner face of which carries a correspondingly shaped pad 377 of leather in juxtaposition to the band 355. The leather pad 377 may be brought into braking engagement with the band 355 merely by applying side pressure to the crank 375.

A sliding keeper or pin actuator 380 is mounted on the crank 375 between the enlarged portion 376 and the inner end of the crank. The keeper 380 may consist of a simple sheet metal clip with side lips 381 received within elongated grooves 382 in the sides of the crank, providing for guiding movement of the clip between the full line position shown in FIG. 19 against a stop pin 383 to and a moved dotted line outer position as shown by the broken lines. The clip carries an outwardly extending finger 385 which, in the moved position, depresses a spring-loaded pin 390 carried in the crank between its normally retracted position, as biased by a small coil spring 392, to a depressed position. The pin 390 is formed with an outer outwardly curved circular head 395, which pin and head in all operative respects may be similar to the pin 250' of FIG. 11. The head 395 is accordingly proportioned to enter the groove 20' and be received under one of the ledges 210 in the manner previously described, simply by sliding the clip 380 outwardly along its grooved track 382 to bring the tapered finger 385 downwardly onto the head of the pin 390, accompanied by rotation of the crank 375.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. A fishing reel comprising: a frame having a cage, and a back plate attached to said cage, a central spindle removably attached to said back plate and extending normally therefrom centrally of said cage, a spool rotatably mounted on said spindle for rotating within said cage and adjacent said back plate, a drag brake for said reel including a brake drum rotatably mounted on said spindle between said spool and said back plate, means connecting said drum to said spool for rotation by said spool and in at least one direction of spool rotation, a brake band adjacent said back plate at least partially encircling said drum, tension adjusting means on said back plate connected to one end of said band for adjustably tensioning said band about said drum for increasing and decreasing the drag on said spool, a friction pad support, a pad of friction material on said support, means on said plate mounting said support for axial movement to bring said pad into and out of braking engagement with said spool, means connected to said support and extending axially outwardly of said plate and engageable by applying a squeezing pressure thereto for causing said axial movement to engage said pad with said spool, means on said support defining an arcuate inner support surface in closely spaced relation to said drum with said brake band between said support surface and said drum, said support at said surface providing a rest position for said band and locating said band with respect to said drum when said tension is released, thereby assuring clearance between said band and said drum and permitting said drum to turn without drag when desired.

2. A fishing reel including a frame with a cage and a back plate attached to said cage, a central spindle attached to said back plate and extending normally therefrom centrally of said cage, and a spool rotatably mounted on said spindle within said cage and adjacent said back plate, the improvement comprising:

a brake drum rotatably mounted on said spindle between said spool and said back plate, a sprag clutch within said drum providing for rotation of said drum in one direction of rotation of said spool only, means in said clutch defining an arcuate slot, a pin fixed to said spool extending axially into said slot and movable therein with relative rotation of said clutch and spool, spring means interposed between said spool and said clutch providing limited rotational movement of said spool in said one direction against said spring means prior to engagement of said clutch to provide for relief of shock which may be caused by sudden loading or pull of a line on said spool, said spring means including a torsion spring on said clutch having an end thereof engaging said pin urging said pin to one extreme limit of said slot and providing for movement of said pin against said spring to an opposite extreme limit of said slot upon the application of a pull on a line on said spool, and brake band means engageable with said brake drum for applying a braking force to said spool by friction between said brake band means and said drum.

3. In a fishing reel having a frame, a back plate, and a spool rotatably mounted in the frame, and a spindle extending axially of the spool mounted rigidly to said back plate, the improvement comprising:

a crank handle, means mounting said handle on an end of said spindle remote from said back plate for relatively free rotation therewith and for limited pivotal movement toward and away from said spool, said spool having a side surface exposed to said crank handle, annular means on said side surface defining a braking surface, means on said crank handle defining a brake pad alignable with said annular surface, said brake pad being engageable with said surface, to provide a retarding force to said spool upon the depression of said handle and said pad thereon into engagement with said surface, means on said spool side surface defining at least one recess terminating at an overhanging ledge, and pin means on said crank handle having a head proportioned to move into said recess for engagement with said spool at said ledge for rotating said spool by said handle in one direction of rotation of said handle and to release said spool in an opposite direction of rotation.

4. In a fishing reel having a frame, a back plate, and a spool rotatably mounted in said frame, and a spindle extending axially of the spool mounted rigidly to the back plate, the improvement comprising:

a crank handle, means mounting said handle on an end of said spindle remote from said back plate for relatively free rotation therewith, means on a side of said spool exposed to said handle defining at least one pair of generally arcuate recesses, each of said recesses being tapered sightly axially of said spool and terminating in an overhanging ledge and inclined in opposite directions defining right and left-hand retrieval slots providing for retrieval on a line in either a right-hand or left-hand operation, a pin movably mounted on said handle to engage said recesses, a head on the end of said pin proportioned to move into said recesses and into engagement with the associated recess ledge when said pin is depressed providing for positive engagement by said crank handle with said spool in one direction of rotation and providing for instant release and disengagement of said handle from said spool upon slight backward movement of said handle in the opposite direction of rotation.

5. A fishing reel including a frame with a cage and a back plate attached to the cage, and a central spindle attached to the back plate and extending generally centrally therefrom and having a spool rotatably mounted on the spindle within the cage adjacent the back plate, the improvement in brake controls for controlling a fish, including:

a first reel brake including a squeeze brake having a brake pad mounted for movement on an inside surface of said back plate adjacent said spool, and further having an exposed surface exteriorly of said back plate for engagement by a hand, for moving said pad into direct frictional engagement with the spool, a crank rotatably mounted on said spindle having an end, a second reel brake including a brake plate carried on the said end of said handle and having a braking pad of friction material on an inside surface thereof, said friction material being movable by said handle into direct engagement with the adjacent surface of said spool by depression of said handle against said spool, and a third reel brake forming an adjustable drag, said adjustable drag including a brake drum rotatably mounted on said spindle between said spool and said back plate, clutch means within said drum and engageable with said spool for rotating said drum in one direction only of spool rotation, a brake band at least partially encircling said drum and having its opposite ends anchored on said back plate, and means adjustably tensioning said band at one of said ends thereof to vary the drag on said spool in said one direction by frictional engagement of said band with said drum.

6. The reel of claim 3 in which said recess extends arcuately of said spool and axially into said spool and terminating at said ledge providing for engagement by said crank handle head in one said direction of rotation only, and providing release upon slight backward movement of said handle out of said recess.

* * * * *